Patented Dec. 29, 1953

2,664,371

UNITED STATES PATENT OFFICE 2,664,371

SOLDERING FLUX

Chester A. Snell, New York, and Jacob M. Fain and John A. De Rosa, Brooklyn, N. Y., assignors to the United States of America as represented by the Secretary of the Army No Drawing. Application December 20, 1951, Serial No. 262,652

2 Claims. (Cl. 148—23)

This invention relates to soldering fluxes and more particularly to soldering fluxes adapted for use in soft soldering on all metals and suitable both as an external flux and for inclusion in the hollow core of solder wire.

In soldering metals or any combination of metals, particularly stainless steel or aluminum, or alloys containing aluminum, the basic difficulty to be overcome is the removal of an oxide film which is formed on the surface of the metal and which therefore interferes with a wetting of the underlying metal by the solder. In order to establish a metal-to-metal contact between the metal being soldered and the solder, the oxide film must be removed either mechanically or chemically. The function of the flux is its use as a chemical means for removing the oxide film.

One of the important properties which characterize a good flux is that it should only superficially attack the metal and yet loosen the oxide film and then dissolve, or otherwise displace, any loosened oxide particles. Another highly desirable property in a flux is the ability to cause a spreading of the solder over the prepared surface. Still another required property which is important, especially in situations where there are delicate metal surfaces to be soldered such as in radio and electrical equipment, is that the flux should not leave a corrosive residue. Such residues tend to promote electrolytic corrosion between the solder and the metal and may thus cause ultimate failure of the joint under unfavorable atmospheric conditions. Furthermore, in many cases, it is difficult and impracticable to wash off or otherwise remove the flux residue. Hence, considerable effort has been made to provide flux compositions that leave non-corrosive residues, or no residue at all.

Some soldering fluxes in commercial use are those which evolve an acid gas when heated in the air to the temperature at which ordinary solder is applied to parts in soldering. These fluxes frequently react with moisture in the air after the soldering operation is completed to produce an acid which corrodes the soldered parts, this corrosion continuing until all of the flux remaining on the parts is hydrolyzed.

It is a primary object of the present invention to provide an active soldering flux which can be used in soft soldering on all metals, particularly ferrous metals and stainless steel.

It is a further object to provide an active soft soldering flux which is substantially non-corrosive.

These and other objects and advantages of the present invention will be better understood as the detailed description thereof progresses.

This invention is based on the finding that the incorporation in a resin base of a boron trifluoride addition product such as boron trifluoride etherate (ethyl ether addition product of boron trifluoride—commercial boron trifluoride etherate contains 48% of boron trifluoride by weight), a quaternary ammonium salt and a plasticizer will result in a product in paste form adaptable for use as an external flux in soft soldering on all metals.

The resin base may consist of a resin such as rosin or abietic acid. When properly plasticized, such a resin base serves the main functions of a vehicle and a diluent for the more active constituents and of a protective coating for their residues when exposed to unfavorable atmospheric conditions.

The quaternary ammonium salt is incorporated to improve the fluxing properties of the composition. The main function of the quaternary ammonium salt is to combine with boron trifluoride and in so doing cause a longer retention of the boron trifluoride during soldering, resulting in an increase in chemical activity of the flux, particularly on ferrous and aluminum metals.

The combination of a resin, such as rosin or abietic acid, and a plasticizer, such as a glycol ether, provide the solubility relationships that are necessary for rendering such compositions into a paste form. The resins are quite soluble at higher temperatures. Thus, when a hot, concentrated solution is cooled while being stirred, the resins are thrown down in the form of minute particles in such quantities as to thicken the solution into a smooth firm paste whose plasticity can be adjusted according to the plasticizer content. The boron trifluoride etherate remains in solution with the plasticizer.

The combination of a resin flux with a boron trifluoride product presents a unique product as far as universality is concerned. Boron trifluoride etherate combined with a quaternary ammonium compound greatly increases the latter's activating power on nickel, stainless steel and aluminum. Without boron trifluoride, there would not be action on stainless steel and aluminum, except by abrasion of these metals during soldering.

The function of the resin is mainly to extend the activity of the flux compositions by dilution, thus rendering its action more uniform and providing a protective cover against air oxidation during soldering. The resin also aids to a great extent in providing a moisture repellent coating in the residues.

The plasticizer must serve the functions of not only plasticizing the resin, but also dissolving the more active constituents. Glycol-ethers are the most suitable to use for this purpose. Examples of these are ethylene glycol monoethyl ether (cellosolve) and ethylene glycol monobutyl ether (butyl cellosolve). Such a solvent being of high molecular weight and low volatility at ordinary temperatures is preferable, as a composition containing it has less tendency to dry out when exposed to the open air.

It is preferable to limit the boron trifluoride etherate to 2% to 5% of the total weight. The quaternary ammonium salt can vary from 10% to 11%; the resin may comprise 57% to 61% and the plasticizer content can generally be placed at 25% to 30% of the total weight. Such compositions are generally light brown in color and vary in plasticity from a soft and mobile to a stiff and firm paste, depending on the relative amounts of resin and plasticizer.

As an example of a paste soldering flux, the following composition and method of preparation may be given:

Rosin, 61%
Ethyl dimethyl cetyl ammonium bromide, 11%
Boron trifluoride etherate, 3%
Butyl cellosolve, 25%.

The above composition is prepared in the following manner. All of the constituents except the resin are dissolved together with the aid of heat to remove all the ether and to make a clear hot solution. This solution is added to molten resin accompanied by stirring and additional heat. The resulting hot, dark-colored solution is rapidly cooled in a water bath to about 50° C., leaving it undisturbed during the cooling. Then, it is vigorously and constantly stirred while its temperature is further lowered to 25° to 30° C. The walls of the container are scraped during the stirring to remove the first precipitate formed. A smooth fairly firm paste is thus obtained and is ready for use as an external flux.

While there have been described what at present are considered to be preferred embodiments of the invention, it will be understood by those skilled in the art that various changes and modifications may be made herein without departing from the invention and it is therefore aimed in the appended claims to cover all such modifications as fall within the spirit and scope of the invention.

What is claimed is:

1. A soldering flux consisting of 61% by weight of rosin, 11% by weight ethyl dimethyl cetyl ammonium bromide, 3.0% by weight of boron trifluoride etherate and 25% by weight of butyl cellosolve.

2. A soldering flux consisting of 2 to 5% by weight of boron trifluoride etherate, about 11% by weight of ethyl dimethyl cetyl ammonium bromide, 25 to 30% by weight of a glycol ether and the remainder being a resin selected from the group consisting of rosin and abietic acid.

CHESTER A. SNELL.
JACOB M. FAIN.
JOHN A. DE ROSA.

References Cited in the file of this patent

UNITED STATES PATENTS

| Number | Name | Date |
|---|---|---|
| 744,413 | Scheele | Nov. 17, 1903 |
| 1,949,916 | McQuaid | Mar. 6, 1934 |
| 2,124,675 | Rummelsberg | July 26, 1938 |
| 2,161,803 | De Stubner | June 13, 1939 |
| 2,261,091 | Maguire | Oct. 28, 1941 |
| 2,291,400 | Miller | July 28, 1942 |
| 2,429,033 | Silman et al. | Oct. 14, 1947 |